United States Patent
Tsuda

(10) Patent No.: US 7,463,294 B2
(45) Date of Patent: Dec. 9, 2008

(54) SIGNAL PROCESSING UNIT FOR CORRECTING SHADING OF IMAGE SIGNAL, AND ELECTRONIC CAMERA

(75) Inventor: Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 727 days.

(21) Appl. No.: 10/843,359

(22) Filed: May 12, 2004

(65) Prior Publication Data

US 2004/0263641 A1 Dec. 30, 2004

(30) Foreign Application Priority Data

May 23, 2003 (JP) ............................. 2003-146046

(51) Int. Cl.
*H04N 9/64* (2006.01)

(52) U.S. Cl. .................. 348/251; 348/241; 348/243; 348/246

(58) Field of Classification Search ................ 348/241, 348/243, 246, 251

See application file for complete search history.

(56) References Cited

U.S. PATENT DOCUMENTS

2001/0028392 A1* 10/2001 Yamamoto et al. .......... 348/207
2002/0140830 A1 10/2002 Shirakawa et al.

FOREIGN PATENT DOCUMENTS

| JP | A 11-032218 | 2/1999 |
| JP | A 2002-072378 | 3/2002 |
| JP | A 2002-335454 | 11/2002 |

* cited by examiner

*Primary Examiner*—Lin Ye
*Assistant Examiner*—Anthony J Daniels
(74) *Attorney, Agent, or Firm*—Oliff & Berridge, PLC

(57) ABSTRACT

A signal processing unit or an electronic camera according to the present invention performs signal processing on an output signal from an image pickup part in the order of horizontal shading correction and OB clamp. In the horizontal shading correction, shading correction is also pre-performed on a lateral OB signal serving as a standard of the OB clamp. The OB clamp is performed using the shading-corrected lateral OB signal as a standard, whereby a noise generated due to shading correction can be effectively reduced.

4 Claims, 5 Drawing Sheets

SIGNAL PROCESSING UNIT FOR CORRECTING SHADING OF IMAGE SIGNAL, AND ELECTRONIC CAMERA

CROSS REFERENCE TO RELATED APPLICATION

The disclosure of the following priority application is herein incorporated by reference: Japanese Patent Application No. 2003-146046, filed May 23, 2003.

BACKGROUND OF THE INVENTION

1. Field of the Invention

The present invention relates to a signal processing method of an image signal. In particular, the present invention relates to a signal processing method of correcting an output signal from an effective pixel area by using an output signal from an optical black area (hereinafter referred to as an "OB signal") of an image pickup part.

2. Description of the Related Art

An image device described in Japanese Unexamined Patent Application Publication No. 2002-335454 (hereinafter referred to as "Patent Document 1") is conventionally known. The image device described in the Patent Document 1 (in particular, FIG. 1 and the paragraphs [0038] and [0084]) is provided with a structure such as an OB clamp section and a shading correcting section.

The OB clamp section uses an OB signal from an optical black area as a standard level of black to perform clamp correction on an output signal from an effective pixel area.

On the other hand, the shading correction section multiplies an output signal from the effective pixel area by a correction coefficient (fixed value) prepared in advance to correct shading occurring in the effective pixel area.

The inventor of the present invention has noticed a problem that noises such as black compression are likely to occur in an image when a signal is processed in the order of the OB clamp and the shading correction as in the conventional example described above.

SUMMARY OF THE INVENTION

An object of the present invention is reducing noises occurring due to the influence of shading correction.

Hereinafter, the present invention will be described.

A signal processing unit according to the present invention fetches an output signal from an image pickup part to perform signal processing on the output signal (in this unit, the image pickup part includes an effective pixel area for photoelectrically converting a subject image and an optical black area in a light-shielded state. The optical black area includes an upper optical black area in a light-shielded state, arranged in a horizontal direction along the effective pixel area, and a lateral optical black area in a light-shielded state, arranged in a vertical direction along the effective pixel area).

The signal processing unit includes a horizontal shading correcting section and an OB clamp section. More specifically, the horizontal shading correcting section obtains horizontal shading based on an output signal from the upper optical black area to subtract the obtained horizontal shading from output signals of the effective pixel area and the lateral optical black area.

On the other hand, the OB clamp section obtains optical black-levels for respective horizontal lines of the effective pixel area based on the "output signal from the lateral optical black area" having been through the horizontal shading, and clamps the "output signal from the effective pixel area" having been through the horizontal shading to make the optical black-levels for the respective horizontal lines constant in value.

The inventor of the present invention has analyzed noises generated due to the shading correction to find the following cause. More specifically, according to the order of signal processing in a conventional example, OB clamp is followed by shading correction. In this case, an output signal from the lateral optical black area (hereinafter referred to as a "lateral OB signal") contains an error variation of the shading.

Therefore, the lateral OB signal has a signal level that is elevated by the amount of the error variation of the shading. If the OB clamp is carried out using the lateral OB signal having the elevated signal level, no margin is left for a black level, thereby causing a noise due to black compression in a dark area.

Based on the above-mentioned knowledge of the inventor of the present invention, the shading correction on the lateral OB signal is executed prior to OB clamp in the unit according to the present invention. In this case, the OB clamp is executed using, as a standard level, the lateral OB signal having a reduced error variation. Therefore, noises due to black compression in a dark area are clearly reduced.

Another signal processing unit according to the present invention fetches an output signal from the image pickup part to perform signal processing on the output signal (the image pickup part includes an effective pixel area for photoelectrically converting a subject image and an optical black area in a light-shielded state).

The signal processing unit includes an OB shading correcting section and a dark current offset section. More specifically, the OB shading correcting section obtains shading based on an output signal from the optical black area (hereinafter referred to as an "OB signal") to subtract the shading from the OB signal, thereby obtaining respective shading-corrected OB signals. On the other hand, the dark current offset section averages the shading-corrected OB signals to obtain a dark current level of the image pickup part so as to remove dark current offset generated in an output signal from the effective pixel area based on the dark current level.

The inventor of the present invention has found the other cause for the generation of noises due to shading correction. More specifically, as exposure time of the image pickup part becomes longer, the amount of a dark current contained in the output signal is more increased. The increased amount of the dark current causes a black level of an image to be needlessly increased, thereby lowering the contrast in the black area.

Therefore, in the case of long time exposure, it is preferred that the amount of a dark current is subtracted from the output signals to eliminate an increase (elevation) of the black level. At this time, if the amount of shading contained in the OB output is large, an error is occurred in estimation of the amount of the dark current. In particular, for the shading in an extremely low band, the subtraction is doubly performed for two processes, i.e., shading correction and dark current offset. As a result, contrary to the intended purpose of the signal processing, a dark area of the image is compressed to generate a noise due to black compression.

Therefore, in the unit according to the present invention, shading correction is performed on the OB outputs to obtain the amount of a dark current based on the shading-corrected OB outputs. In this case, occurrence of a phenomenon that the shading in a low band is doubly subtracted from the output signals is reduced. As a result, a noise due to black compression in a dark area is clearly reduced.

An electronic camera according to the present invention includes: an image pickup part having an "effective pixel area for photoelectrically converting a subject image" and an "optical black area in a light-shielded state"; and the signal processing unit recited in claim 1 or 2.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Hereinafter, a preferred embodiment of the present invention will be described in detail with reference to the accompanying drawings.

Figure 1:
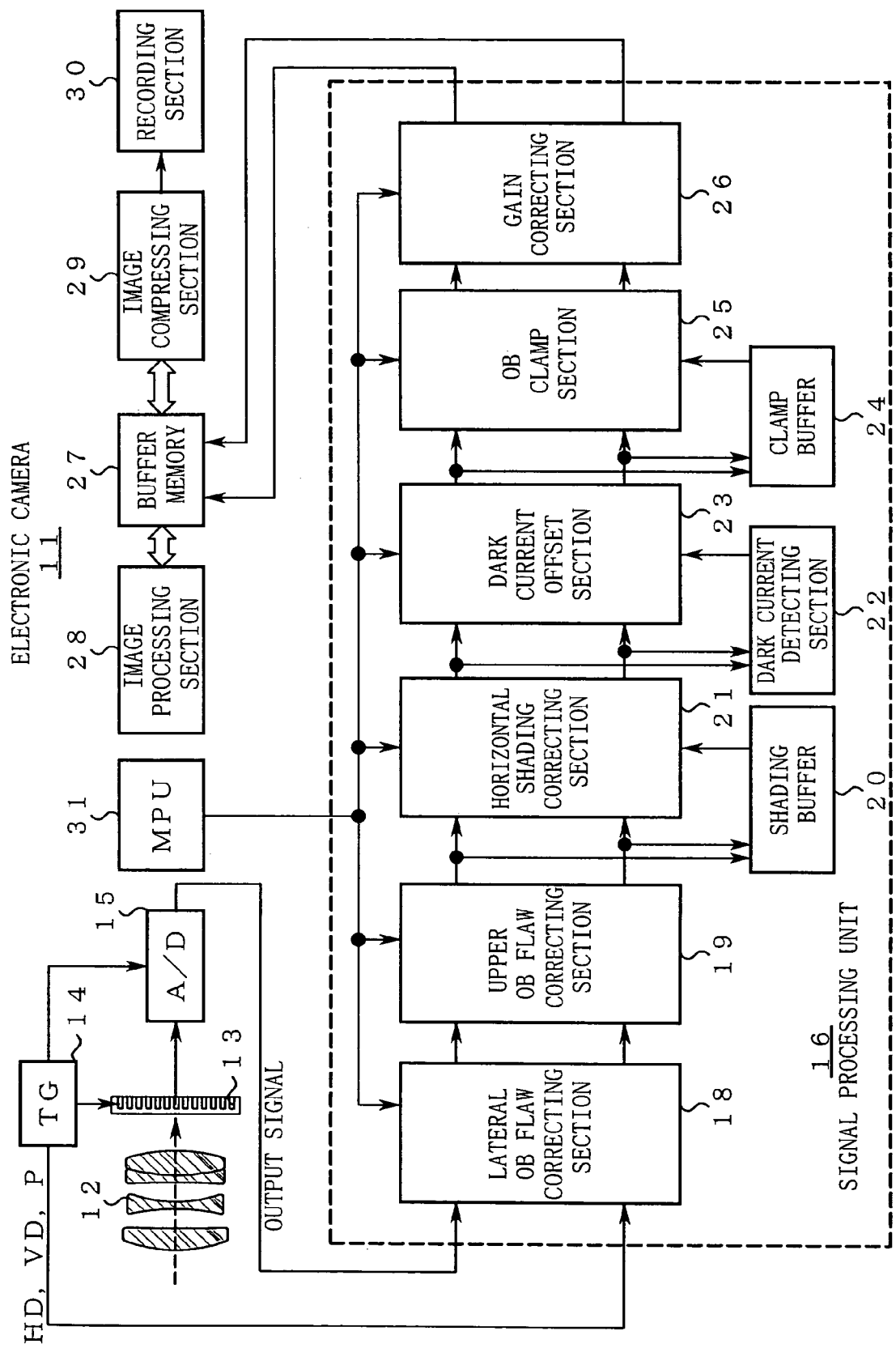
FIG. 1 is a diagram showing an electronic camera 11 according to an embodiment of the present invention.

FIG. 1 is a diagram showing an electronic camera 11 according to an embodiment of the present invention. In FIG. 1, a taking lens 12 is attached to the electronic camera 11. An imaging area of an image sensor 13 is placed in an image space of the taking lens 12.

Figure 2:
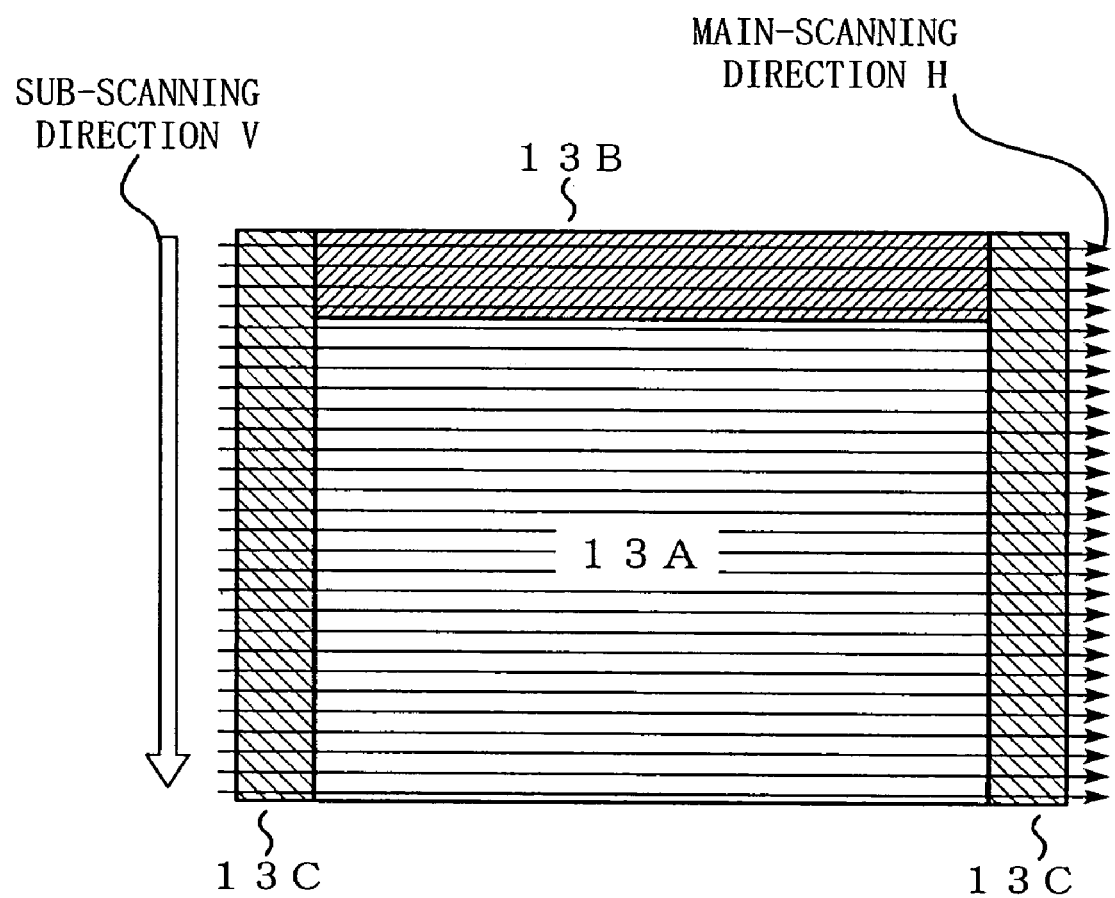
FIG. 2 is a diagram for illustrating an imaging area of an image sensor 13.

On the imaging area of the image sensor 13, an effective pixel area 13A, an upper optical black area 13B, and lateral optical black areas 13C are arranged as shown in FIG. 2. The effective pixel area 13A photoelectrically converts a subject image to generate an image signal. On the other hand, the upper optical black area 13B is arranged on the upside of the effective pixel area 13A along a horizontal direction thereof, and is put in a light-shielded state. The lateral optical black areas 13C are arranged on the right and the left of the effective pixel area 13A along a vertical direction thereof, respectively, and are put in a light-shielded state.

A timing generator 14 drives the image sensor 13 to scan an output signal from each of the areas 13A to 13C in a main-scanning direction H and a sub-scanning direction V shown in FIG. 2 to read out the output signal. After being digitized through an A/D conversion section 15, the digitized output signal is input to a signal processing unit 16. A horizontal synchronizing signal HD, a vertical synchronizing signal VD, and a pixel clock P in synchronization with the output signal are output from the timing generator 14. These signals are also input to the signal processing unit 16.

The following constituting elements are provided in the signal processing unit 16.

[1] a lateral OB flaw correcting section 18;
[2] an upper OB flaw correcting section 19;
[3] a shading buffer 20;
[4] a horizontal shading correcting section 21;
[5] a dark current detecting section 22;
[6] a dark current offset section 23;
[7] a clamp buffer 24;
[8] an OB clamp section 25; and
[9] a gain correcting section 26.

These constituting elements process the output signal substantially in real time along a signal path shown in FIG. 1 in a pipelined manner.

The output signal from the effective pixel area 13A, which is output from the signal processing unit 16 (that is, the image signal), is temporarily stored in a buffer memory 27.

An image processing section 28 for performing color interpolation, edge enhancement and the like on the image signal and an image compressing section 29 for performing image compression on the image signal are connected to a data bus of the buffer memory 27. An image-compressed file generated in the image compressing section 29 is recorded by a recording section 30 on a removable recording medium.

Furthermore, the electronic camera 11 is equipped with a microprocessor 31 for system control. The microprocessor 31 sets a register value for operation setting to each of the constituting elements of the signal processing unit 16.

Correlation with the Invention

Hereinafter, the correlation between the invention and this embodiment will be described. The correlation described herein is only an exemplary interpretation for reference, and therefore does not intend to unnecessarily limit the present invention.

A horizontal shading correcting section recited in the claims corresponds to the horizontal shading correcting section 21.

An OB clamp section recited in the claims corresponds to the OB clamp section 25.

An OB shading correcting section recited in the claims corresponds to the horizontal shading correcting section 21.

A dark current offset section recited in the claims corresponds to the dark current offset section 23.

An image pickup part recited in the claims corresponds to the image sensor 13 and the timing generator 14.

Description of Operation of the Signal Processing Unit 16

Figure 3:
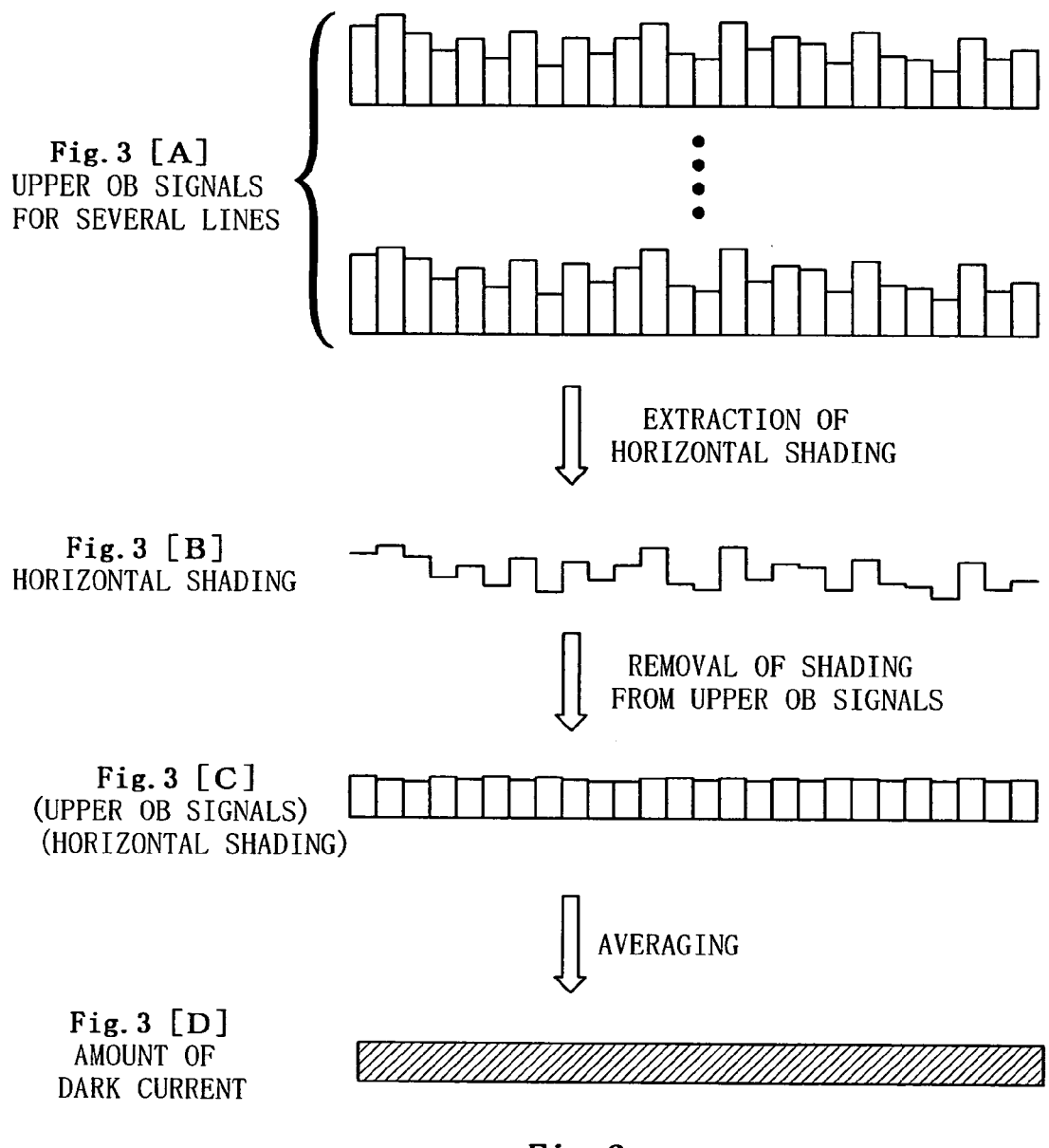
FIGS. 3[A] to [D] are diagrams for illustrating signal processing according to the embodiment of the present invention.

FIGS. 3[A] to [D] and 4[A] to [D] are diagrams for illustrating signal processing of the signal processing unit 16.

The signal processing of the signal processing unit 16, which constitutes a characteristic of the present invention, will now be described.

First, after the output signals which are output from the imaging sensor 13 in the scanning order shown in FIG. 2 are digitized via the A/D conversion section 15 per pixel, the digitized signals are input to the lateral OB flaw correcting section 18. The lateral OB flaw correcting section 18 detects the output signals from the lateral optical black areas 13C (lateral OB signals) to perform flaw/defect correction on the lateral OB signals.

The output signals passing through the lateral OB flaw correcting section 18 are sequentially input to the upper OB flaw correcting section 19. The upper OB flaw correcting section 19 detects output signals from the upper optical black area 13B (upper OB signals) to perform flaw/defect correction on the upper OB signals.

The shading buffer 20 selectively fetches several lines of the first half of the upper OB signals from the output signals passing through the upper OB flaw correcting section 19 (see FIG. 3[A]).

The shading buffer 20 vertically adds the several lines of the upper OB signals to average them. Furthermore, the shading buffer 20 extracts a horizontal level fluctuation from the averaged upper OB signals to store it as the amount of horizontal shading (see FIG. 3[B]).

The horizontal shading correcting section 21 sequentially fetches the output signals passing through the upper OB flaw correcting section 19. The horizontal shading correcting section 21 first fetches the remaining several lines of the upper OB signals from the output signals. The horizontal shading correcting section 21 subtracts the amount of horizontal shading stored in the shading buffer 20 from the upper OB signals for each of the lines to output the shading-corrected upper OB signals (see FIG. 3[C]).

Subsequently, the horizontal shading correcting section 21 fetches out the output signals from the effective pixel area 13A and the lateral optical black areas 13C for each of the horizontal lines based on the horizontal synchronizing signal HD (see FIG. 4[A]).

Figure 4:
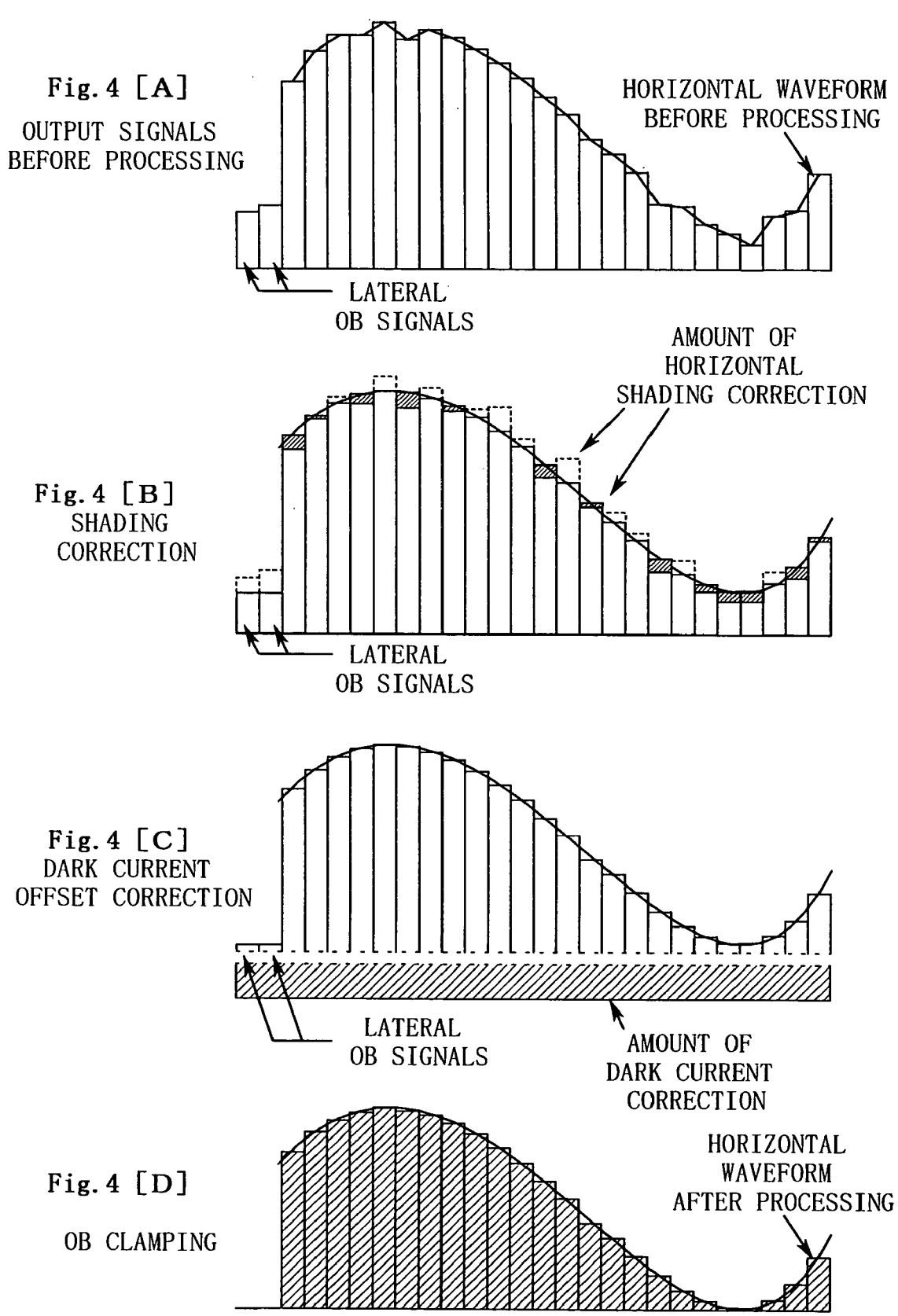
FIGS. 4[A] to [D] are other diagrams for illustrating the signal processing according to the embodiment of the present invention.

The horizontal shading correcting section 21 subtracts the horizontal shading stored in the shading buffer 20 from the output signals for each of the horizontal lines to output the shading-corrected lateral OB signals and image signals (see FIG. 4[B]).

The dark current detecting section 22 fetches the shading-corrected upper OB signals from the output signals passing through the horizontal shading correcting section 21. The dark current detecting section 22 averages the shading-corrected upper OB signals to extract the amount of a direct current and store it as the amount of a dark current (see FIG. 3[D]).

The dark current offset section 23 fetches the output signals passing through the horizontal shading correcting section 21. In the case of long time exposure, the dark current offset section 23 uniformly subtracts the amount of the dark current stored in the dark current detecting section 22 from the output signals, to output the dark-current offset-corrected output signals (see FIG. 4[C]).

The clamp buffer 24 selectively fetches the lateral OB signals from the output signals passing through the dark current offset section 23. The lateral OB signals have already been subjected to the above-described shading correction and dark current correction.

The clamp buffer 24 averages the lateral OB signals for each of the horizontal lines to store the averaged lateral OB signals as an optical black-level of the lines that follow.

The OB clamp section 25 fetches the output signals of the effective pixel area 13A from the output signals passing through the dark current offset section 23. The output signals have also already been subjected to the above-described shading correction and dark current correction.

The OB clamp section 25 clamps the output signals of the effective pixel area 13A so that the optical black-levels are uniformed to a constant value (see FIG. 4[D]).

After the output signals passing through the OB clamp section 25 are subjected to gain correction in the gain correcting section 26, the output signals are output from the signal processing unit 16.

EFFECTS OF THE EMBODIMENT AND THE LIKE

Figure 5:
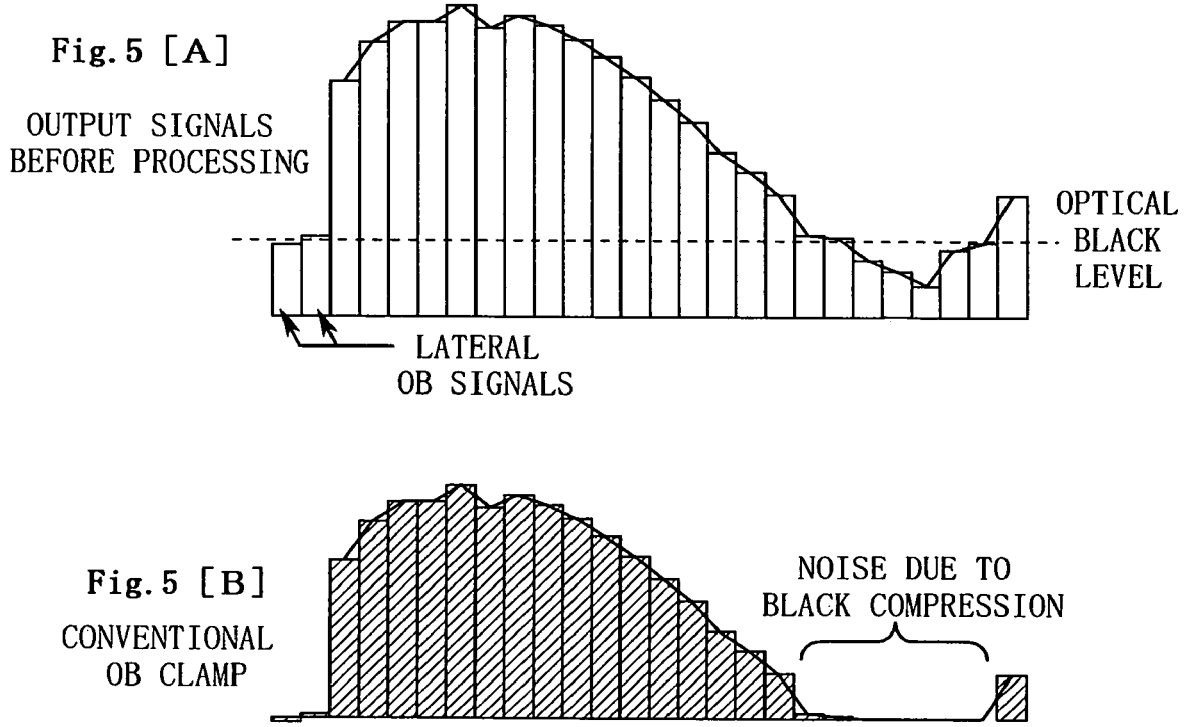
FIGS. 5[A] and 5[B] are diagrams for illustrating signal processing according to a conventional example.

FIGS. 5[A] and [B] are diagrams illustrating signal processing in a conventional example.

Lateral OB signals shown in FIG. 5[A] have not been subjected to shading correction and dark current offset correction yet. In the conventional example, OB clamp is executed using the lateral OB signals not having been corrected as a standard.

Normally, the amount of shading in the lateral OB signals is relatively large, depending on a variation of each image sensor 13. FIG. 5[A] shows a case where the lateral OB signals become larger than the output signals from the effective pixel area (in particular, a dark area) due to the amount of shading. In this case, as shown in FIG. 5[B], a noise due to black compression is generated in a dark area after OB clamp.

On the other hand, no noise due to black compression is generated after OB clamp as shown in FIG. 4[D] in the above-described embodiment, even when the output signals are under the same condition as those of the conventional example.

This is because the amount of horizontal shading is removed from the lateral OB signals prior to OB clamp. As a result, the lateral OB signals hardly become larger than the output signals from the effective pixel area (in particular, a dark area), thereby remarkably reducing a noise due to black compression.

It should be noted in this embodiment that no new structure is added to perform shading correction on the lateral OB signals. More specifically, in this embodiment, the horizontal shading correcting section 21 is just moved before the OB clamp section 25 as shown in FIG. 1. The horizontal shading correcting section 21 executes not only the shading correction of the effective pixel area 13A but also the shading correction on the lateral OB signals. Thus, this simple structure achieved by only slightly changing the processing order rationally reduces the noise due to black compression, which cannot have been solved heretofore.

Furthermore, in this embodiment, the upper OB signal used for detecting the amount of a dark current is also subjected to the shading correction in advance (see FIG. 3[C]). Therefore, there arises no inconvenience that the amount of the dark current is detected higher by the amount of low-band components of the horizontal shading than its actual value. As a result, the output signal is not lowered than necessary in the dark current offset correction, thereby allowing a further reduction of generation of a noise due to black compression.

It should be further noted in this case that no new structure is added to perform shading correction on the lateral OB signals. More specifically, in this embodiment, the horizontal shading correcting section 21 is just moved before the dark current offset section 23 as shown in FIG. 1. The horizontal shading correcting section 21 executes not only the shading correction of the effective pixel area 13A but also the shading correction on the upper OB signals. Thus, this simple structure achieved by only slightly changing the processing order rationally reduces the noise due to black compression, which cannot have been solved heretofore.

As described above, since the signal processing is executed in the order of shading correction, dark current offset (which may be executed only in the case of long time exposure), and the OB clamp in this embodiment, the generation of noises associated with the shading correction can be successfully and remarkably reduced by the above-described rational process and simple structure.

SUPPLEMENTARY MATTERS IN THE EMBODIMENT

In this embodiment, the horizontal direction and the vertical direction of the imaging area are specified so that they correspond to the main-scanning direction H and the sub-scanning direction V shown in FIG. 2. However, the horizontal direction and the vertical direction in the present invention are not limited thereto. For example, the present invention may be executed specifying the main-scanning direction as the vertical direction and the sub-scanning direction as the horizontal direction.

The upper optical black area is situated on the upper end of the effective pixel area in this embodiment. However, the upside and the downside of the imaging area can be flexibly defined by changing the order of scanning in vertical direction. Therefore, the position of the upper optical black area is not limited to the apparent upper side of the effective pixel area. In general, any position of the upper optical black area is allowed as long as the upper optical black area is arranged in the horizontal direction along the effective pixel area. Therefore, the upper optical black area can also be arranged below the lower end of the effective pixel area.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A signal processing unit that performs signal processing on an output signal from an image pickup part that includes: an effective pixel area for photoelectrically converting a subject image; an upper optical black area in a light-shielded state, arranged in a horizontal direction along the effective pixel area; and a lateral optical black area in a light-shielded state, arranged in a vertical direction along the effective pixel area, the signal processing unit comprising:

a horizontal shading correcting section that obtains a horizontal shading value based on an output signal from the upper optical black area and subtracts the horizontal shading value from an output signal from the effective pixel area and an output signal from the lateral optical black area; and an OB clamp section that obtains optical black-levels for respective horizontal lines based on the output signal from the lateral optical black area that has been through the horizontal shading, and that clamps the output signal from the effective pixel area that has been through the horizontal shading to make the optical black-levels for the respective horizontal lines constant in value.

2. A signal processing unit that performs signal processing on an output signal from an image pickup part that includes an effective pixel area for photoelectrically converting a subject image, and an optical black area in a light-shielded state, the signal processing unit comprising:

an OB shading correcting section that obtains a shading value based on an output signal from the optical black area, wherein an output signal from the optical black area is hereinafter referred to as an OB signal, and subtracts the obtained shading value from the OB signal to obtain respective shading-corrected OB signals; and a dark current offset section that averages the shading-corrected OB signals to obtain a dark current level of the image pickup part so as to remove dark current offset generated in an output signal from the effective pixel area based on the dark current level.

3. An electronic camera comprising:

an image pickup part including an effective pixel area for photoelectrically converting a subject image and an optical black area in a light-shielded state; and the signal processing unit according to claim 1.

4. An electronic camera comprising:

an image pickup part including an effective pixel area for photoelectrically converting a subject image and an optical black area in a light-shielded state; and the signal processing unit according to claim 2.

* * * * *